United States Patent

[11] 3,571,701

[72] Inventor Tin-Hwai Lai
 46, Kuang Jih Rd. Wu Jih, Taichung, China /Taiwan
[21] Appl. No. 691,274
[22] Filed Dec. 18, 1967
[45] Patented Mar. 23, 1971

[54] APPARATUS HAVING AUDIBLE AND VISUAL INDICATOR MEANS FOR DETECTION OF LEAKAGE CURRENTS AND INCLUDING CROCODILE CLIP AND MAGNETIC SURFACE ATTACHMENT MEANS
2 Claims, 2 Drawing Figs.

[52] U.S. Cl. .................................................. 324/51
[51] Int. Cl. ................................................. G01r 31/02
[50] Field of Search .......................................... 324/51, 53, 72.5, 133, 28; 339/12

[56] References Cited
UNITED STATES PATENTS

| | | | |
|---|---|---|---|
| 2,231,660 | 2/1941 | Carlotti et al. | 324/53 |
| 2,477,642 | 8/1949 | Novello | 324/51X |
| 2,685,061 | 7/1954 | Stelzenmuller | 324/51 |
| 2,716,216 | 8/1955 | Schwenzfeier | 324/133 |
| 2,721,717 | 10/1955 | Wales | 339/12X |
| 3,259,754 | 7/1966 | Matheson | 324/133X |
| 3,267,452 | 8/1966 | Wolf | 324/133X |
| 3,408,562 | 10/1968 | Mazurkevics | 324/28 |
| 3,416,074 | 12/1968 | Schoonover | 324/72.5X |
| 2,276,736 | 3/1942 | Olson | 324/51X |
| 2,536,577 | 1/1951 | Simmons et al. | 324/72.5UX |
| 3,404,340 | 10/1968 | Labrie | 324/51X |

Primary Examiner—Gerard R. Strecker
Attorney—Lane, Aitken, Dunner and Ziems

ABSTRACT: Apparatus for the detection of leadage currents consisting of a housing containing a buzzer for audible indication and having a magnetic surface for attachment to ferrous metal, the housing also having a clip which serves as an alternative attachment means, a gas discharge lamp for visual indication being provided connected in parallel with the buzzer, and an earth wire connecting with one side of the buzzer, the other side being connected to the housing which is conductive.

3,571,701

INVENTOR:
TIN-HWAI LAI
BY Lane, Aitken, Dunner & Ziems

APPARATUS HAVING AUDIBLE AND VISUAL INDICATOR MEANS FOR DETECTION OF LEAKAGE CURRENTS AND INCLUDING CROCODILE CLIP AND MAGNETIC SURFACE ATTACHMENT MEANS

BACKGROUND OF THE INVENTION

This invention relates to apparatus for the detection of leakage currents, such current being indicated audibly and visually. Leakage currents may flow between, for example, the external casing of a domestic appliance and "true" earth or ground, due to a potential difference existing between the appliance and ground. Such a casing may be that of a fan, electric drill or the like, and may become "live" due to the failure of wire insulation or a suppressor capacitor.

When leakage currents are present, there is a danger that fire may be caused by some defect in the electrical equipment, or that personnel may be injured or even killed by accidental contact with such defective electrical equipment.

The object of this invention is to provide a simple and inexpensive device, which may be used by untrained persons, to detect and indicate leakage currents both audibly and visually.

SUMMARY OF THE INVENTION

The invention accordingly provides an apparatus for the detection of leakage currents comprising a housing enclosing an electrically operated sound emitting device, a magnet fastened to said housing, a clip also fastened to said housing, and a gas discharge tube arranged so that a leakage current flowing from the housing through an earth wire is indicated both audibly by the said sound emitting device and visually by the gas discharge lamp.

The clip may be a so-called 'crocodile clip,' one handle of which is fastened to the housing and the other of which includes a gas discharge lamp.

The housing is preferably rectangular and made of metal and has a platelike magnet fixed to one face, the one handle of the crocodile clip being fixed to an adjacent face.

It can then be seen that the device according to the invention provides a simple and inexpensive means for indicating leakage currents. The device may be used in the home or factory and may be attached to any appliance either magnetically or by the clip, for example to an electric fan, cooker, iron, starter motor or pipeline.

The intensity of the sound emitted and brightness of the lamp gives an indication of the seriousness of the leakage.

Further, the device requires no external source of power.

BRIEF DESCRIPTION OF THE DRAWINGS

The invention will be further illustrated in conjunction with the attached drawings. In the drawings.

DESCRIPTION OF PREFERRED EMBODIMENT

Figure 1:
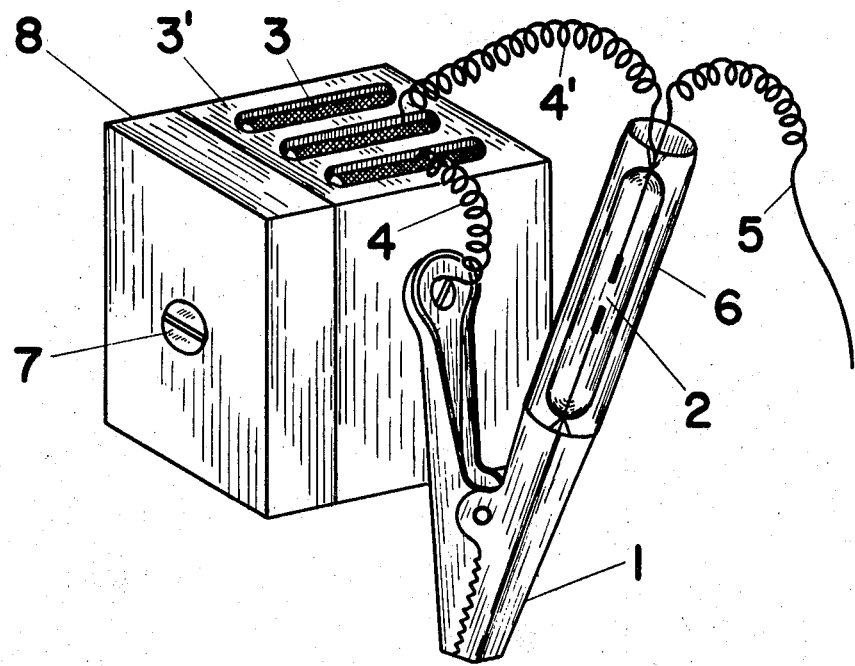
FIG. 1 is a general view, in perspective, of the device; and,
FIG. 2 is an electrical circuit diagram of the device.
Figure 2:
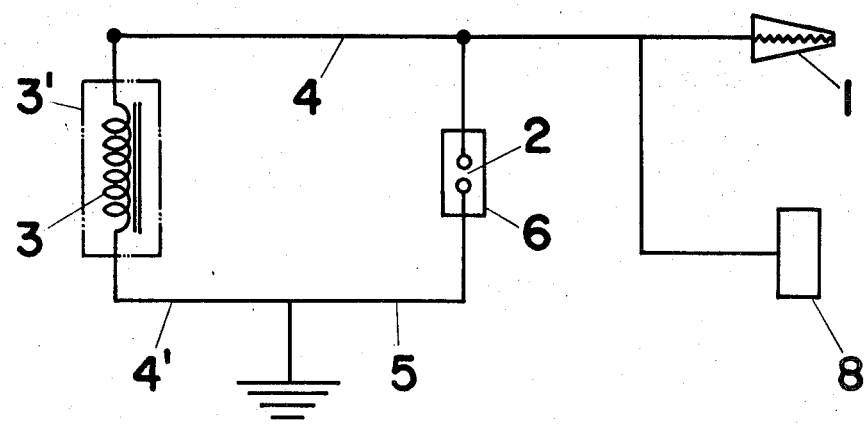

As shown in the drawings, the device comprises a crocodile clip, 1 handle of which is connected to a housing 3', the other handle having a gas discharge lamp 2 with a protective plastic shield 6. The housing 3' contains a buzzer 3 and has a magnet 8 fixed to one surface by a screw 7. The magnet makes electrical contact with the metal housing 3'. The device may then be attached to an appliance by the clip or by the magnet. A wire 4' connects one terminal of the buzzer to the 'earth' side of the gas discharge lamp 2, and this side of the lamp is connected to earth or ground by a wire 5. Another wire 4 connects the other terminal of the buzzer to the clip or metal housing 3'. The electrical circuit may be seen in FIG. 2.

In use, the device is attached to any part of an electrical appliance where leakage is to be detected. The device may be attached by the crocodile clip 1 or, if the appliance has a casing of iron or steel, by the magnet 8.

The wire 5 is connected to 'earth' or ground and any current which flows is indicated by the buzzer and lamp. The intensity of sound emitted by the buzzer and the brightness of the lamp serve to indicate the strength of the leakage.

I claim:

1. A device for detection of the potential difference between a housing of electrical machinery and ground comprising:
 a housing;
 an audio signaling means located in said housing and having first and second terminals, said audio signaling means being operable to produce an audible signal having an intensity which is proportional to the detected potential difference when energized by an electrical potential applied between said first and second terminals;
 circuit means for electrically connecting said first terminal to ground;
 connecting means including an electrical conductor connected to said second terminal for electrically connecting said second terminal to said machinery housing;
 a crocodile clip for releasably holding said electrical conductor in electrical contact with said machinery housing, said crocodile clip defining at least a pair of legs, one of said legs being conductively secured to said housing, the other of said legs comprising a light transmitting casing, said crocodile clip further being capable of releasably clamping to said machinery housing;
 a signal lamp located in said casing including a first terminal and a second terminal, said first terminal being connected to ground, said second terminal being capable of being connected to said machinery housing through said other leg of said crocodile clip; and
 a magnet secured to a face of said housing, said magnet being in electrical circuit with said second terminal of said audio signaling means and one of said legs of said crocodile clip for magnetically holding said conductor in electrical contact with said machinery housing whereby said audio signaling means and signal lamp are simultaneously operable to produce both an audible signal and visible light, each having an intensity which is proportional to the detected potential difference when a very low level electrical potential is applied across said first and second terminals of each of said audio signaling means and said signal lamp.

2. A device as recited in claim 1 wherein said case comprises a plastic light transmitting case, said signal lamp being mounted within said case.